INVENTORS
KUNIO YONEZU
KATUHIKO KIDA

BY

ATTORNEY

United States Patent Office 3,402,077
Patented Sept. 17, 1968

3,402,077
STORAGE BATTERIES AND METHOD OF
MANUFACTURING THE SAME
Katuhiko Kida, Oji, Kusatu, and Kunio Yonezu, Kyoto,
Japan, assignors to Japan Storage Battery Company,
Ltd., Kyoto, Japan, a corporation of Japan
Filed Oct. 4, 1965, Ser. No. 492,506
Claims priority, application Japan, Dec. 19, 1964,
39/71,847
3 Claims. (Cl. 136—6)

This invention relates generally to storage batteries, and methods of manufacturing the same, and more particularly to a new and improved type of portable lead acid storage batteries, and methods of manufacturing the same.

Portable lead acid storage batteries are widely in use as primary and secondary power sources. The present day lead acid storage batteries, however, have certain disadvantages which prevent their most efficient and effective utilization. For example, the prior art batteries are prone to leakage of fluid or electrolyte and excessive evolution of gas accompanied by sulphuric acid foam. Consequently, it is necessary to constantly supply water to replace the lost fluid. Furthermore, in the gel-type electrolyte, to which this invention is more specifically directed, the gel has often tended to liquify to sol and thus hasten leakage, or to solidify at an accelerated rate such that voids would occur in the electrolyte. Optimum consistency and rate of gel was difficult to obtain.

There have been many attempts in the prior art to correct the foregoing deficiencies. For example, a catalyst may be used to liquefy the oxygen and hydrogen which evolve during the termination of charging, in order to restore the water to the electrolyte. This solution, however, leaves much to be desired; it prevents reduction in the size of the battery, and the problem of excessive fluid leakage is not satisfactorily solved.

Another solution which has been used in the past, is to transform the electrolyte to gel form and to limit the charging current applied to the battery to limit the loss of liquid caused by electrolysis. This latter method tends to cause loss of a certain amount of water by electrolysis during the charging step. Also, the life of the battery may be shortened by desiccation of the gel electrolyte. Therefore, this latter method tends to lose certain advantages of secondary battery.

Accordingly, it is an object of this invention to substantially prevent leakage of electrolyte from portable lead acid storage batteries, and to substantially prevent evolution of sulphuric acid foam.

Another object of this invention is to eliminate the necessity of constantly replacing lost fluid consistent with improved battery life.

A further object is to provide a gel form electrolyte which has substantially few voids or cavities, and which is optimal in consistency and rate of gel formation.

A yet further object of this invention is to enable rapid, facile and simple placement of gel form electrolyte between the electrode assemblies of storage batteries.

Another object of this invention is to substantially prevent loss of water from the electrolyte during charging; or if a small amount of water is lost, to otherwise substantially prevent desiccation of gel electrolyte.

Further objects of this invention are to reduce the loss of capacity during non-use; to retain substantially equal life of each cell of a multiple celled battery; to securely protect the negative electrode from oxidation by the atmospheric ambient; and to substantially prevent overcharge.

These and other objects of this invention are obtained in an illustrative embodiment thereof which is manufactured according to the following methods in which gel form electrolyte of a known type is used. According to this invention, silicon dioxide of $1\mu$ diameter or less, and in an amount ranging from three (3) to ten (10) weight percent, and preferably from four (4) to six (6) weight percent is dispersed in an electrolyte mixture. If the concentration is less than three (3) weight percent, the strength of the gel is weakened, and any vibration of the battery would tend to convert the gel to sol form thus increasing the leakage of fluid from the battery whenever it is in a non-normal position. On the other hand, if the concentration is more than ten (10) weight percent, the gel will form at an excessively rapid rate and filling of the gel into associated electrode compartments will be rendered difficult and unsatisfactory.

The formation of the gel may be before or after placement of the electrolyte constituents into the battery or electrode containers. In one alternative method, a sol form electrolyte mixture including dispersed silicon dioxide, namely colloidal silica, of an average diameter ranging from 0.01 to $0.02\mu$ diameter and in a suitable amount, and a suitable amount of inspissated sulphonic acid may be poured from the upper section of the battery into associated electrode compartments and caused to gel within the compartments.

In an alternative method, the gel form electrolyte, made of suitable ingredients and suitable amount of silicon dioxide of suitable size may first be stirred violently to cause it to become sol because of its thixotropic properties, then poured into associated electrode compartments. Since the viscosity of the gel is relatively high, the battery structure should be vibrated while the electrolyte (now sol form) is being poured between the electrodes. The degree of vibration varies according to such factors as quantity of silicon dioxide, size of battery compartments, size of electrodes; the degree of vibration may range from 0.5 gram to 5 grams.

In a third alternative method, colloidal silica in an appropriate amount and size and sulphuric acid may be placed in separate containers and separately transmitted to a mixing machine wherein each is disposed in small amounts and mixed to form a sol electrolyte. The mixture is then forcefully emitted from the mixing machine into the electrode compartments of the battery.

The colloidal silica and sulphuric acid may, in a variation of the immediately foregoing method, instead be forcefully directed into the battery container and caused to be mixed therein. It is advisable to shoot the colloidal silica in pulverized form or with accurate aim and to mix the two elements in the space above the electrodes.

In the latter two methods, accumulated air in the plate and separator regions will tend to be forced out, thereby assisting the mixing of the sol. It may be helpful to first mix the sol and form the gel within the battery container, then to position the electrodes into the gel thereby completing the battery structure.

In one illustrative embodiment of this invention, the battery comprises a plurality of cells, each cell comprising a plurality of negative and positive electrodes arranged in a grid with separators between them. The electrodes and separators may be of any known type. It has been found that a corrugated type of separator made of any type of porous rubber or plastic material is preferable. The negative electrodes may be of larger capacity than the positive electrodes to compensate for self discharge during non-use, or both of the electrodes may be made of an alloy of lead comprising a metal selected from the group consisting of calcium, barium, strontium, and tin, in an amount of 0.5% or less.

According to one feature of this invention, a liquid chamber capable of holding liquid is provided above the electrolyte container. The chamber may be a porous acid proof material in which water may be stored. The water in the liquid chamber will seep through cracks in the gel to effectively replace any fluid lost by electrolysis during the charging step.

Above the liquid chamber, a single valve is provided common to all of the cells of the battery. The valve is operable at a predetermined pressure to release excess pressure from the cells through an exhaust chamber in which the sulphuric acid foam may be sedimented, to the atmosphere. According to this invention, the common valve is accessible to each cell via a channel which interconnects all of the cells. This results in savings of space and enables interchange of moisture between the cells to even out any uneven moisture distribution in the different cells. In this manner the life of the battery is lengthened and substantially equals that of each cell, insofar as battery life is affected by desiccation of the electrolyte. By forcing the excess pressure to be relieved by expulsion of gas first through the exhaust chamber, the sulphuric acid foam is retained in the cell thereby making the battery safe as far as harmful chemical expellent is concerned. By preselecting the pressure at which the valve will release to be slightly above outside atmospheric pressure, the outside ambient air will not be able to penetrate into the cells to cause erosion of the electrode. Thus, the negative electrodes will have longer life.

In one particular embodiment of this invention, the valve, which will be described in detail hereinafter, briefly comprises a valve seat and a valve cover positioned on the valve seat. Above the valve cover is a valve presser which is used to initially regulate the proper pressure at which the valve cover will open. From the valve an opening to the exhaust chamber is provided.

According to the inventive method of manufacture, first the gel is placed as above discussed into the container with the electrodes and separators suitably arranged with respect to each other. Next the liquid chamber is placed above the electrolyte with a porous plate between the chamber and electrolyte. Thereafter, a cover is placed on top of the chamber with interconnecting channels therebetween and accessible to a common valve structure which is then placed on the cover arrangement. The valve is located adjacent the exhaust compartment which may have a filter placed therein.

After the exhaust compartment and valve are securely fastened in the battery structure, the battery is charged to the proper voltage. During the charging the valve presser is released and the valve is left open for a certain length of time. Gas is evolved and expelled from the cells. The valve is then closed completely by rotating the valve presser. When the battery has been partially charged at the selected current value and for a selected amount of time, the valve presser is again rotated slightly to enable the gas to escape slightly. Thereupon, the top cover of the battery is sealed to the battery container.

This invention, its objects, features and advantages will best be more readily understood from a consideration of the following detailed description taken in connection with the accompanying drawing, in which.

Figure 1:
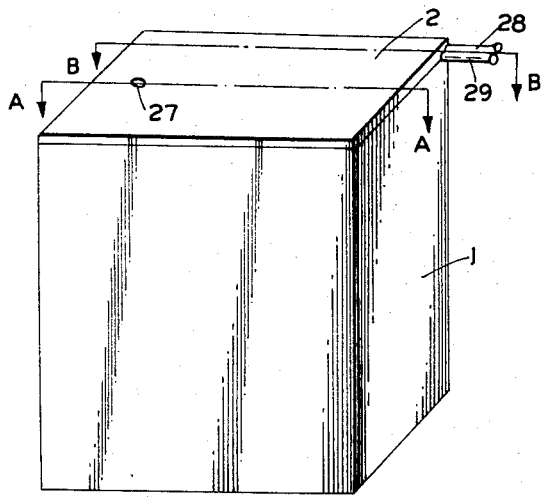
FIG. 1 depicts in a perspective view, an illustrative embodiment of this invention.
Figure 2:
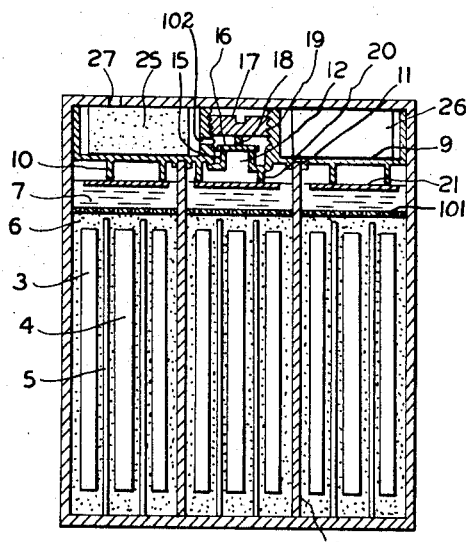
FIG. 2 depicts a section of the embodiment of FIG. 1, taken along section line AA′.
Figure 3:
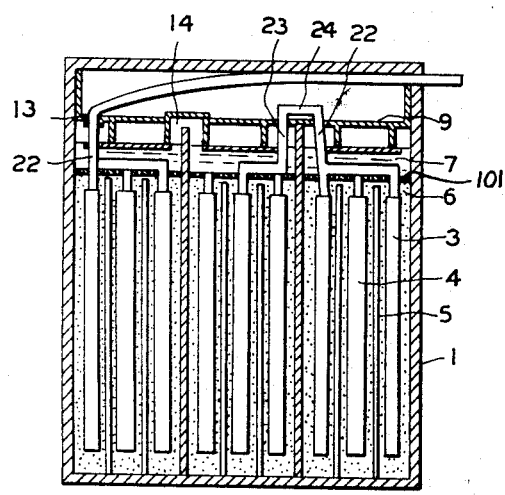
FIG. 3 depicts another section of the embodiment of FIG. 1, taken along section line BB′.

Turning now to the drawing, in FIGS. 1, 2 and 3, there is depicted a three cell, lead acid storage battery comprising a case or container 1 and a cover 2 sealed thereto. The container 1 and cover 2 may be of any known material. In each cell there is disposed in the manner depicted, a plurality of negative electrodes 3, a plurality of positive electrodes 4, a plurality of corrugated separators 5 located between the positive and negative electrodes, gel form or type electrolyte 6, a liquid container 7 in which water may be stored, and a plate 21 for holding the liquid container 7 in place.

The separators 5 may be of any known type. It has been found, however, that a flat separator which adheres closely to the electrodes will produce increased internal resistance because desiccation of the gel electrolyte will produce cracks or apertures between the separator and electrodes, which flat separators will not counteract. It is preferable that a corrugated type of separator be used. Any porous rubber or plastic material such as polystyrene, polyvinyl chloride, or polyethylene, or paper saturated with resin, or perforated plastic sheet may be used for the separator.

As depicted, the electrodes 3 and 4 of this inventive battery are arranged in a grid array and are made of any known type of alloy generally used in lead acid batteries. However, since storage batteries, which must be left unattended and unused for long periods of time, have a tendency to self discharge, the lead antimony alloys which do not control such tendency are not the most advantageous for use. When lead antimony is used, a greater number of positive electrodes are used than negative electrodes to reduce the effects of self discharge. Another solution to this problem lies in the selection of an alloy for use in the electrodes which reduces the self discharge. In this invention, a lead alloy having less than 0.5 percent calcium, barium, strontium, or tin may be used for the electrodes. It has been found that these alloys are less prone to self discharge.

Most batteries having gel type electrolyte tend to lose a certain amount of water by electrolysis during charging. In this invention, any existent cracks or voids in the gel 6 are utilized to enable the oxygen gas evolved by the electrolysis to react with the negative electrode 3. In this manner, the loss of water may be reduced. Moreover, in this invention, any lost water may be replaced by water stored in the liquid chamber 7.

The chamber 7 may have sponge-like properties, and comprise acid proof fibrous material such as glass fiber, synthetic resin fiber, or other fibrous material which is heat treated or treated with resin to be both acid proof and capable of holding water or other fluids. The chamber may also be of vinyl sponge or have porous diatomic earth metals therein. The liquid chamber 7 is held between the projection of the intermediate cover 9, and plate 101 (21), and a perforated or porous plate which may be located immediately above the electrolyte 6. The water or other fluid which is held in the chamber 7 may be dispersed through cracks in the electrolyte to replace any lost fluid.

Between each cell is a spacing wall 8 on top of which an intermediate cover 9 may be attached by means of grooves 11 in the manner shown. The intermediate cover 9 may have projections 10 to contact the plates 21 to assist in holding the liquid chamber 7 in place.

Above the intermediate cover 9 are a left and right compartment with a valve arrangement 12 therebetween as depicted in FIG. 2.

The left compartment is for screening excess gas which the valve 12 releases. A passageway 102 exists from the valve 12 to the exhaust compartment or chamber. In the exhaust compartment, a filter 25 is provided for removing sulphuric acid foam prior to release of the excess gas through exhaust hole 27 located in the cover 2 as depicted in FIGS. 1 and 2. The exhaust compartment advantageously prevents exposure of the valve arrangement to outside environment and prevents damage thereto. The filter 25 may be a fibre or sponge-like and should absorb or neutralize sulphuric acid.

The right compartment formed by intermediate cover 9 in FIG. 2, is used for carrying the interconnected terminal cables 22 and 23 to the terminal posts 28 and 29 of FIG. 1 of the battery. When the cables have been put into the compartment, a binding or sealing agent 26 is poured into the compartment to seal it. After the binding agent 26 hardens, and as will be discussed, the valve is adjusted, the cover 2 is placed on the case 1. As more clearly depicted in FIG. 3, the terminals or cables 22 and 23 are brought out through holes (e.g. 13) located in the intermediate cover 9, through the right compartment of FIG. 2, and out of the battery casing 1 and cover 2 to form positive and negative terminal posts 28 and 29 of the battery as shown in FIG. 1. The binding agent used to seal the cables, and connections between the electrodes of each cell may be such materials as epoxy resin, polyester resin or phenolformaldehyde resin.

As depicted more specifically in FIG. 3, the intermediate cover 9 forms passageways 14 between each cell in order to evenly distribute moisture therebetween and to provide access for each cell to the valve 12 depicted in FIG. 2. Thus, in the event of loss of water from desiccation of the gel electrolyte in one cell exceeds loss of water from another cell, fluid from the liquid chamber and the moisture from all of the other cells will make up the difference. The sulphuric acid concentration is sufficiently high in each cell so that in the event the gel electrolyte from one cell desiccates, it would tend to absorb moisture vapors from one cell, which moisture vapors would in turn be replaced by vapors from the other cells. Accordingly, it has been found that the life of the entire multi-celled battery is about equal to the life of the individual cell insofar as the cells are affected by desiccation of the gel electrolyte.

The passageways 14 are protected from short circuiting by a coat of acid proof hydrophobic oil or paste, such as silicon or fluorine resin.

The negative electrodes of each cell are interconnected by rods or cables 22 and led out of holes 13 as depicted in FIG. 3, to form negative terminal 28 in FIG. 1. Similarly, the positive electrodes of each cell are interconnected by cables 23 and lead out (not shown) as positive terminal 29 in FIG. 1. The positive and negative electrodes of the adjoining cells may be interconnected by a connector 24 as shown in FIG. 3.

Returning again to the embodiment of FIGS. 1, 2 and 3, the valve 12 comprises valve seat 15, valve cover 16, valve plug or presser 17 having a protrusion or projections 18 in contact with the valve cover 16. The plug 17 may be screwed into the threads of the valve holder 19 in the manner depicted. The valve seat 15 has a projection 20 which is used to hold the plate 21 in place with the assistance of the projection 10 of the intermediate cover 9. The valve seat is adjusted so that its protrusion 20 is touching the plate 21 of the middle cell at about the same distance as the protrusion 10 from the intermediate cover 9 of the same cell. The valve seat 15 and the valve cover 16 may be made of synthetic rubber such as butyl rubber or neoprene rubber, or of plastic material such as polyvinyl chloride or polyethylene.

Intimate leak proof contact is made between the valve seat 15 and the valve cover 16. Acid proof hydrophobic substance, such as oil or paste form of silicon resin or fluorine resin may be applied to the contacting surfaces of the valve seat 15 and valve cover 16 to promote efficient operation and prevent unwanted leaks.

Advantageously, the valve 12 through which excess gas evolved by the battery may escape, is common to all of the cells. Savings of space and elements are affected. The channels 14 of FIG. 3 which are formed by the middle or intermediate cover 9, as shown in FIG. 3, interconnect the cells commonly to the valve 12, and provide a passageway for gas, which may evolve from each cell, to escape.

The valve of FIG. 2 is made to open at a preselected pressure which is higher than atmospheric pressure to prevent damage to the cells from excessive pressure created by gas evolving during charging. The valve cover 16 remains tightly over the valve seat 15 at pressures below atmospheric pressure to prevent oxygen from the outside ambient from oxidizing the negative electrodes 3. In this inventive battery, oxygen gas evolved from the positive electrode 4 is caused to travel through the cracks in the gel 6 to the negative electrode 3 and cause its oxidation. The negative electrode 3 tends to be substantially reduced to lead sulphate during the charging and evolves hydrogen gas as a result of the chemical process. Hence, very little gas is generated during the charging and termination of charging. The positive electrodes 4 tend to more readily accept full charge than do the negative electrodes 3. Also, the negative electrodes 3 tend to be more readily self discharged. Thus, it may be advisable to have greater capacity in the negative electrodes 3 than the positive electrodes 4 for most efficient operation of the battery.

Although, the valve 12 depicted in FIG. 2 comprises a valve seat 15 and valve cover 16 arrangement, other types may be employed for equally good results. In this other type, a tube having an open end positioned in the interior of the battery may be used. The other end of the tube may be closed and a hole formed in the side thereof. About the tube and in close proximity to the hole, an annular collar may be fixed, which is operable by a plug type arrangement such as depicted in FIG. 2.

This inventive battery has been assembled and manufactured according to the following method. First, into the container 1 the positive and negative electrodes 3 and 4 are suitably positioned in each cell divided by the wall spacings 8 with the separators 5 disposed between the negative and positive electrodes. The spacing between the separators, and electrodes should suitably be measured in accordance with known methods. Into the spacings between the electrodes of each cell the gel electrolyte 6 may be poured. The electrolyte may be formed in the different alternative ways as discussed in detail above. These methods vary in the place and manner in which the silicon dioxide is mixed with the sulphuric acid; however, the amount of silicon dioxide must be within the range of 3 to 10 weight percent of the total electrolyte, and preferably from 4 to 6 weight percent, and must be of a size less than 1 micron in diameter.

When the electrolyte is properly gelled and filled in each cell to a predetermined level, a porous plate may be positioned above it, held by the spacing wall 8. This plate is not shown in the drawing. Next to the plate, or if no plate is used, next to the electrolyte 6, a liquid chamber 7 is disposed. In the chamber 7 a proper amount of suitable fluid, such as water, or other appropriate liquid, is poured. The chamber being absorbent of liquid will hold the liquid.

Next, the electrodes may be connected together by a known method, such as by welding or soldering. The connection of positive 4 and negative 3 electrodes in a particular configuration will depend upon the total voltage and power capacity desired of the total battery.

The chamber is then covered with a plate 21, on top of the plate an intermediate covering 9 is placed and attached to the walls of the casing 1 and wall spacing 8. Care should be taken that the passageways 14 of FIG. 3 are properly aligned to provide access for all cells to the valve 12. The hole 13 in the intermediate cover 9 should be positioned near the negative and positive electrode cables.

The electrodes 3 and 4 may, of course, be interconnected after the intermediate cover 9 is placed, provided the electrodes are of sufficient lengths.

The periphery of the cover 9, passageways and hole are then sealed by pouring a binding agent, such as of the type mentioned above, into the space between the intermediate cover 9 and the casing walls 1.

After the binding agent is poured into the cable carrier compartment (right compartment in FIG. 2) the battery may be charged with a suitable current. While this is being done, the valve presser 17 should be adjusted to release the valve cover 16 from the valve seat 15 to release the evolving gas. After a time, the valve presser 17 is turned and the valve cover 16 is closed against the valve seat 15. The gel electrolyte 6 will probably not have desiccated very much. After a while electrolysis may start up because of the charging current, thus causing evolution of gas. When the battery has been fully charged by the fixed current value applied for fixed period of time, the pressure will reach a particular value. At that time, the valve presser 17 should be turned to cause the valve cover 16 to open slightly. In this slightly open condition of the valve for the particular value of pressure, the valve presser 17 should be fixed.

Next place a filter 25 in the exhaust compartment. Finally, the top cover 2 should be sealed into place with a known binding agent.

The battery produced according to the foregoing manufacturing methods have been found to excel in life and various other characteristics because of the elimination or reduction of the above-mentioned problems. Various tests were made on the batteries. The charging characteristics were found to be excellent. In the tests two types of battery charges were used. One type of charging circuit which may be used with this invention is shown in schematic diagram form in FIG. 4. In the series of tests of this invention, a charging period of 20 hours at a certain rate.

It is to be understood that the specific embodiments and examples herein described are merely illustrative of the principles of this invention, and that various modifications may be devised by those skilled in the art without departing from the spirit and scope of this invention.

What is claimed is:
1. A portable lead acid storage battery comprising
a container for holding a plurality of cells,
a plurality of negative and positive electrodes comprising lead alloyed with less than 0.5 percent of a metal selected from the group consisting of calcium, barium, strontium and tin,
a plurality of separators positioned between said positive and negative electrodes, said plurality of separators comprising porous rubber or plastic material,
a gel-type electrolyte comprising sulphuric acid and silicon dioxide of an amount ranging from 3 to 10 percent of the total electrolyte and of a size less than 1 micron diameter, disposed in each cell in contact with said positive and negative electrodes,
a supply of water,
a liquid chamber means for holding said water, comprising a sponge-like acid-proof material disposed above said electrolyte,
means for covering said liquid chamber means,
electrical means for commonly interconnecting the respective positive electrodes,
electrical means for commonly interconnecting the respective negative electrodes,
means commonly interconnecting said plurality of cells for providing interchange of moisture therebetween and for providing a common outlet for excess gas,
valve means operable at a preselected pressure for releasing excess gas from said plurality of cells, said valve means being disposed above said means for covering said liquid chamber and accessible by each of said plurality of cells through the means commonly interconnecting said plurality of cells,
said valve comprising a valve seat,
a valve cover, and
a valve presser which regulates the position of said valve cover with respect to said valve seat,
said valve seat and said valve cover being of a resilient plastic material,
an exhaust compartment located above said means for covering and interconnected to said valve means,
said exhaust compartment having a filter for removing acid foam from said gas before release from said battery container, and
means for sealing said container, said last mentioned means having an escape hatch for said gas and providing an outlet for the interconnected negative and positive electrodes.

2. Storage battery according to claim 1, wherein said silicon dioxide is in the form of highly dispersed sol and comprises particles of 0.01 to 0.02 microns in diameter, and wherein said sol and said sulphuric acid are mixed immediately prior to disposing in said cells.

3. Storage battery according to claim 2, wherein said sol is poured into said cells while concurrently said cells are vibrated.

References Cited

UNITED STATES PATENTS

| | | | |
|---|---|---|---|
| 2,951,106 | 8/1960 | Ruetschi | 136—26 |
| 3,150,012 | 9/1964 | Tanaka | 136—157 |
| 3,172,782 | 3/1965 | Jache | 136—6 |
| 3,177,096 | 4/1964 | Jache | 136—6 |
| 3,200,014 | 8/1965 | Roberts | 136—6 |
| 3,208,884 | 9/1965 | Jensen | 136—6 |
| 3,257,237 | 6/1966 | Jache | 136—6 |

WINSTON A. DOUGLAS, *Primary Examiner.*

C. F. LeFEVOUR, *Assistant Examiner.*